(12) United States Patent  (10) Patent No.: US 9,107,397 B2
Mora  (45) Date of Patent: Aug. 18, 2015

(54) FISHING AID

(71) Applicant: Roger M. Mora, Las Vegas, NV (US)

(72) Inventor: Roger M. Mora, Las Vegas, NV (US)

( * ) Notice: Subject to any disclaimer, the term of this patent is extended or adjusted under 35 U.S.C. 154(b) by 0 days.

(21) Appl. No.: 14/621,274

(22) Filed: Feb. 12, 2015

(65) Prior Publication Data

US 2015/0150232 A1 Jun. 4, 2015

Related U.S. Application Data

(63) Continuation-in-part of application No. 13/682,571, filed on Nov. 20, 2012, now Pat. No. 8,984,798.

(51) Int. Cl.
*A01K 97/10* (2006.01)
*A01K 97/12* (2006.01)
*A01K 99/00* (2006.01)

(52) U.S. Cl.
CPC ............... *A01K 97/10* (2013.01); *A01K 97/125* (2013.01); *A01K 99/00* (2013.01)

(58) Field of Classification Search
CPC ..... A01K 97/12; A01K 97/125; A01K 97/10; A01K 99/00; E04H 12/2215; E04H 12/2269; A45B 2023/0012; Y10S 224/922
See application file for complete search history.

(56) References Cited

U.S. PATENT DOCUMENTS

| | | | |
|---|---|---|---|
| 2,804,819 A | 9/1957 | Whealton | |
| 3,033,502 A | 5/1962 | Silver | |
| 3,874,107 A * | 4/1975 | Wheaton | 43/17 |
| 3,882,629 A * | 5/1975 | Kaye | 43/17 |
| 4,004,365 A | 1/1977 | Manchester | |
| 4,154,015 A | 5/1979 | Holland | |
| 4,506,468 A | 3/1985 | Willhite | |
| 5,044,109 A * | 9/1991 | Fast | 43/21.2 |
| 5,210,971 A * | 5/1993 | Efantis | 43/21.2 |
| 5,228,228 A * | 7/1993 | Meissner | 43/17 |
| 5,349,775 A * | 9/1994 | Mondares | 43/21.2 |
| 5,639,057 A * | 6/1997 | Yeomans | 248/530 |
| 5,813,164 A * | 9/1998 | Liberto | 43/21.2 |
| 6,646,557 B2 | 11/2003 | Brake | |
| 8,695,268 B2 | 4/2014 | Gouthro et al. | |
| 2005/0246939 A1 | 11/2005 | Keck | |
| 2012/0017487 A1 * | 1/2012 | O'Keefe | 43/21.2 |

* cited by examiner

*Primary Examiner* — Kathleen Alker
(74) *Attorney, Agent, or Firm* — Weide & Miller, Ltd.

(57) ABSTRACT

A fishing aid includes a tubular sleeve. The sleeve is divided into upper and lower compartments. The sleeve includes a pole holder including a biased bracket inside the upper compartment, and an indicator in the lower compartment. The indicator is triggered by a first contact and a second contact touching one another. The first contact is disposed in the upper compartment and the second contact is disposed on the pole holder. The spring actuating bracket is deflected by a fishing pole in the first compartment to cause the second contact on the pole holder to touch the first contact on the sleeve. A rod holder is disposed on an outer surface of the sleeve. The fishing aid further includes a rod with a spiked tip. The rod is received in the rod holder such that the sleeve is configured to be supported on the rod via the rod holder.

11 Claims, 10 Drawing Sheets

FISHING AID

CROSS REFERENCE TO RELATED APPLICATION

This application is a continuation in part of U.S. application Ser. No. 13/682,571 which was filed on Nov. 20, 2012, the contents of which are hereby incorporated by reference in their entirety.

BACKGROUND

1. Field

The disclosed embodiments relate to fishing devices. More specifically, the disclosed embodiments relate to fishing aids to help users, such as disabled users, know when a fish is on the line.

2. Related Art

Fishing, aside from being source of livelihood, is a recreational activity that can be done by everyone. People of ages participate in fishing including families with children, business partners, and friends. When fishing, people often would like to focus their attention on other things while waiting for a fish to bite their hook. For others, disabilities may prevent them from actively fishing, or even staying in a position to hole a fishing pole for extended periods of time.

As an example, the basic idea for this invention resulted from a study of military veterans all around the world who courageously served their country and fought for freedom, but who are now handicapped and would like to rest while fishing. Thus, there is a need for a device that enables people to fish while resting, playing, or otherwise focusing on tasks other than fishing, while not taking away from the natural fishing experience. Such a device should enhance and make fishing stress free and more enjoyable.

SUMMARY

The disclosed embodiments have been developed in light of the above and aspects of the invention may include a fishing aid that includes a fishing pole holder sleeve with an audio and visual alarm. The fishing aid may especially benefit people with physical disabilities, such as those who have limited mobility or who are deaf and blind, but yet maintain an interest in fishing. However, this fishing aid may benefit hobbyists and professionals alike who enjoy fishing.

According to embodiments of the present invention, a fishing aid includes a tubular sleeve. The sleeve is divided into upper and lower compartments. The sleeve includes a pole holder including a biased bracket inside the upper compartment, and an indicator in the lower compartment. The indicator is triggered by a first contact and a second contact touching one another. The first contact is disposed in the upper compartment and the second contact is disposed on the pole holder. The spring actuating bracket is deflected by a fishing pole in the first compartment to cause the second contact on the pole holder to touch the first contact on the sleeve. A rod holder is disposed on an outer surface of the sleeve. The fishing aid further includes a rod with a spiked tip. The rod is received in the rod holder such that the sleeve is configured to be supported on the rod via the rod holder.

In some embodiments, the indicator is a piezo buzzer, a light, or a combination of a piezo buzzer and a light.

In some embodiments, the first contact may be mounted to an adjustable bite sensor configured to change an amount of deflection in the biased bracket needed to cause the first and second contacts to touch. The adjustable bite sensor may comprise a wing bolt.

In some embodiments, the fishing aid may comprise a drain in a lower end of the first compartment. The fishing aid may further comprise a shaft holder disposed on the lower end of the first compartment, the shaft holder being configured to receive and support a handle of a fishing pole.

In some embodiments, the rod holder may be comprised of a plurality of projections extending from the sleeve. The lower projections of the plurality of projections may each include a through-hole, and an uppermost projection of the plurality of projections may include a depression. The through-holes and depression may be disposed in alignment with one another. An upper surface of the rod opposite the spiked tip may be configured to be seated in the depression.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF EMBODIMENTS

Figure 1:
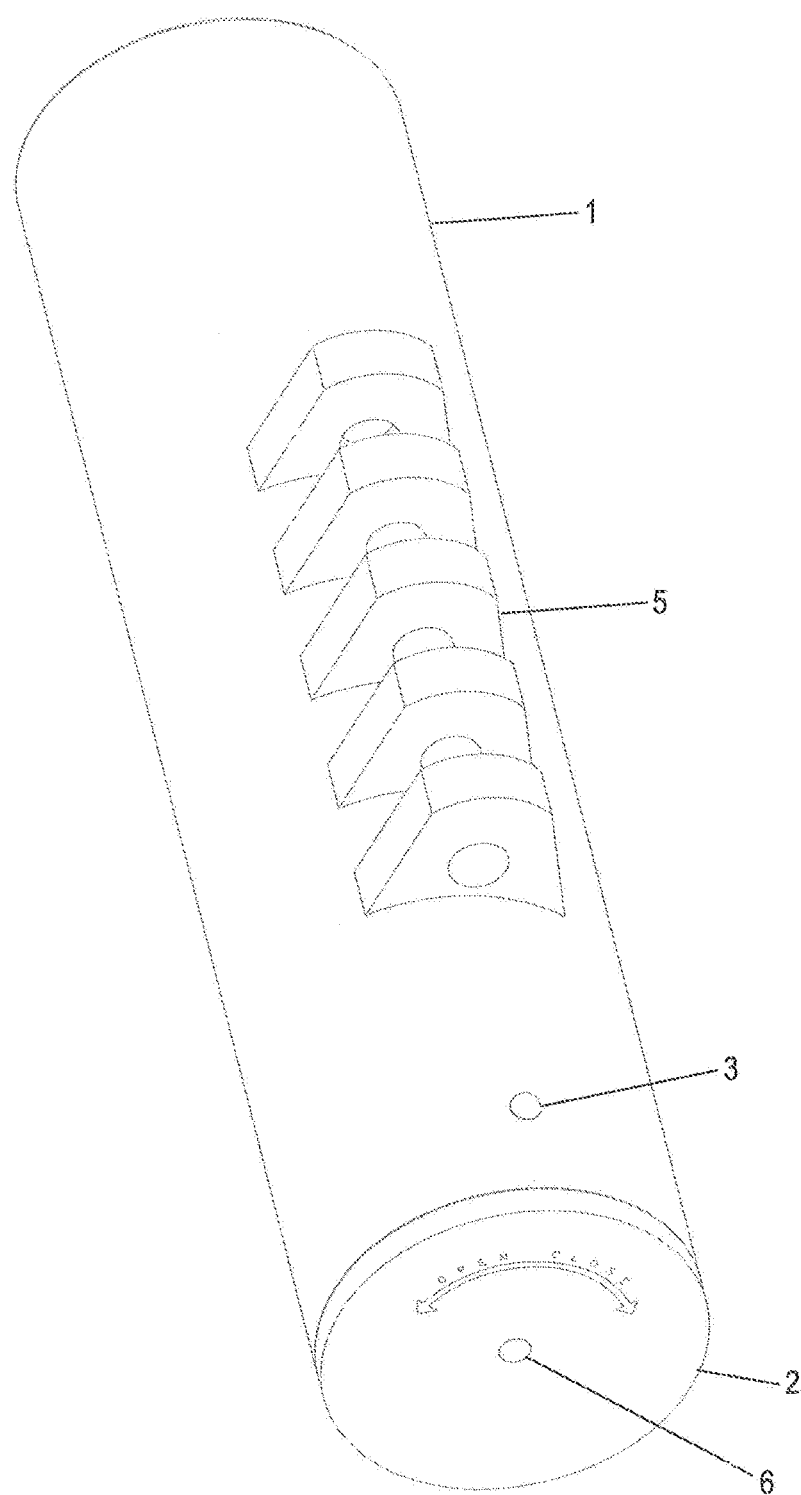
FIG. 1 is a front view of a sleeve of a fishing aid according to an exemplary embodiment.
Figure 2:
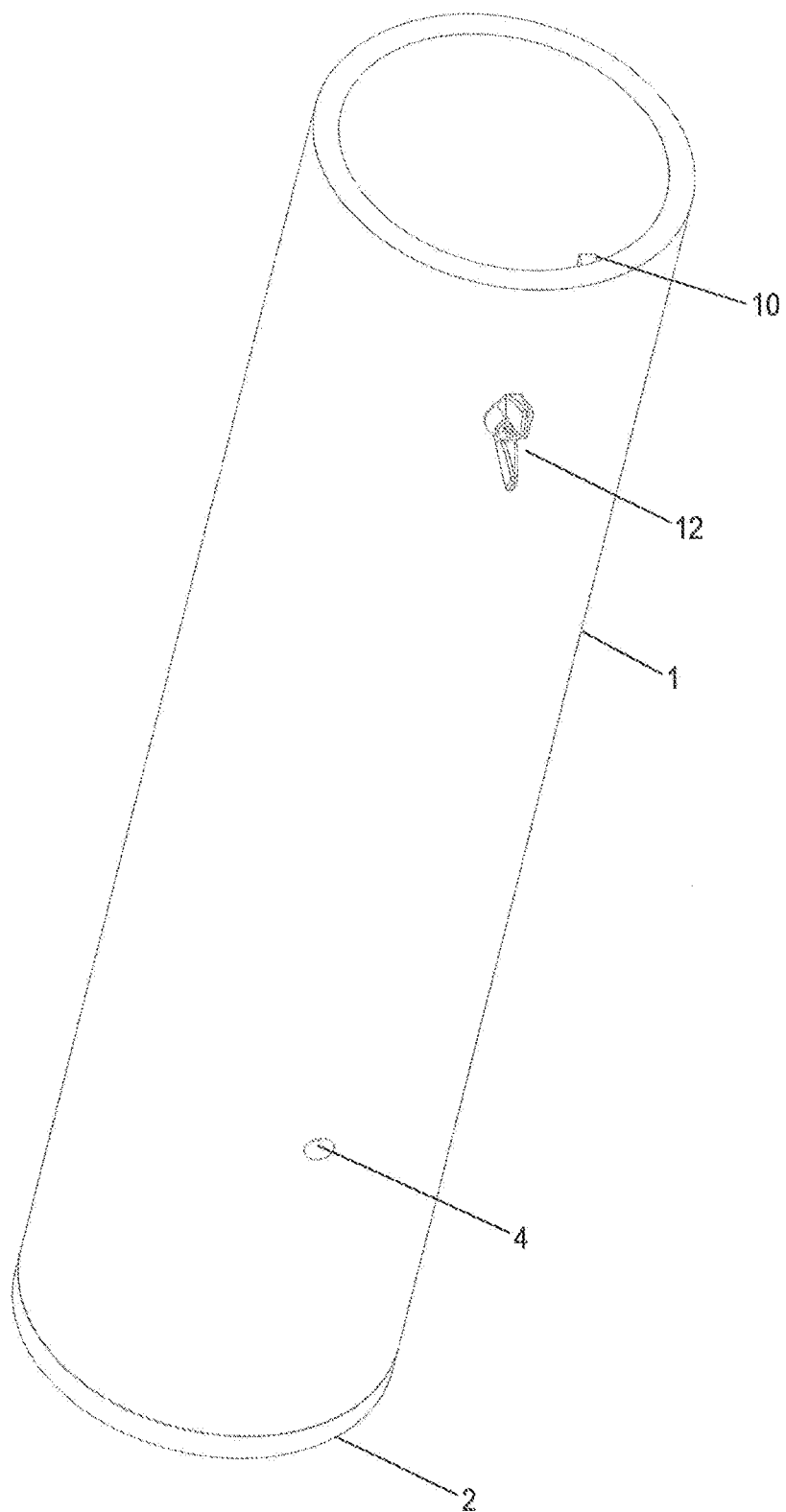
FIG. 2 is a back view of the sleeve of FIG. 1, according to an exemplary embodiment.
Figure 3:
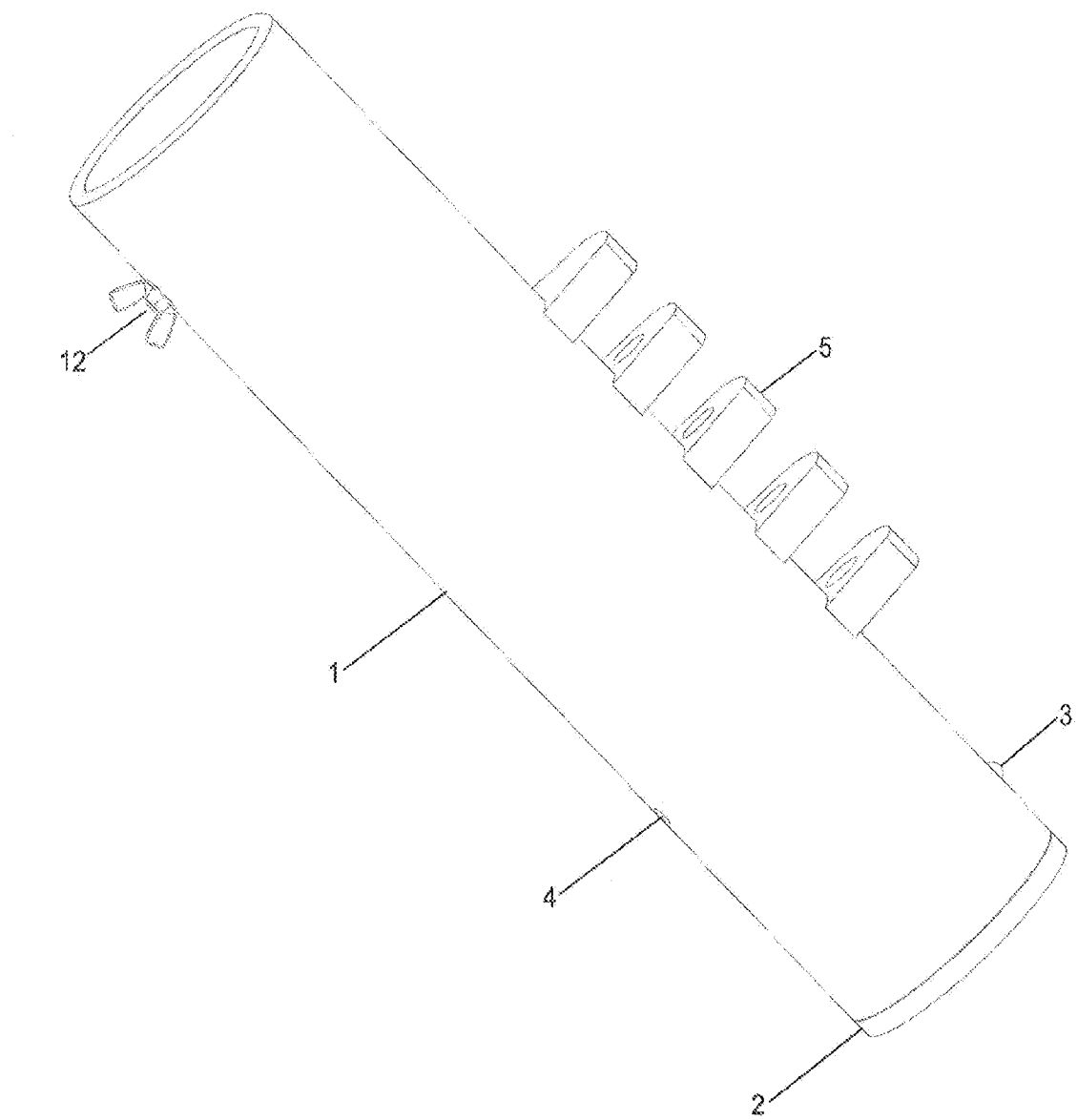
FIG. 3 is a side view of the sleeve of FIG. 1, according to an exemplary embodiment.
Figure 4:
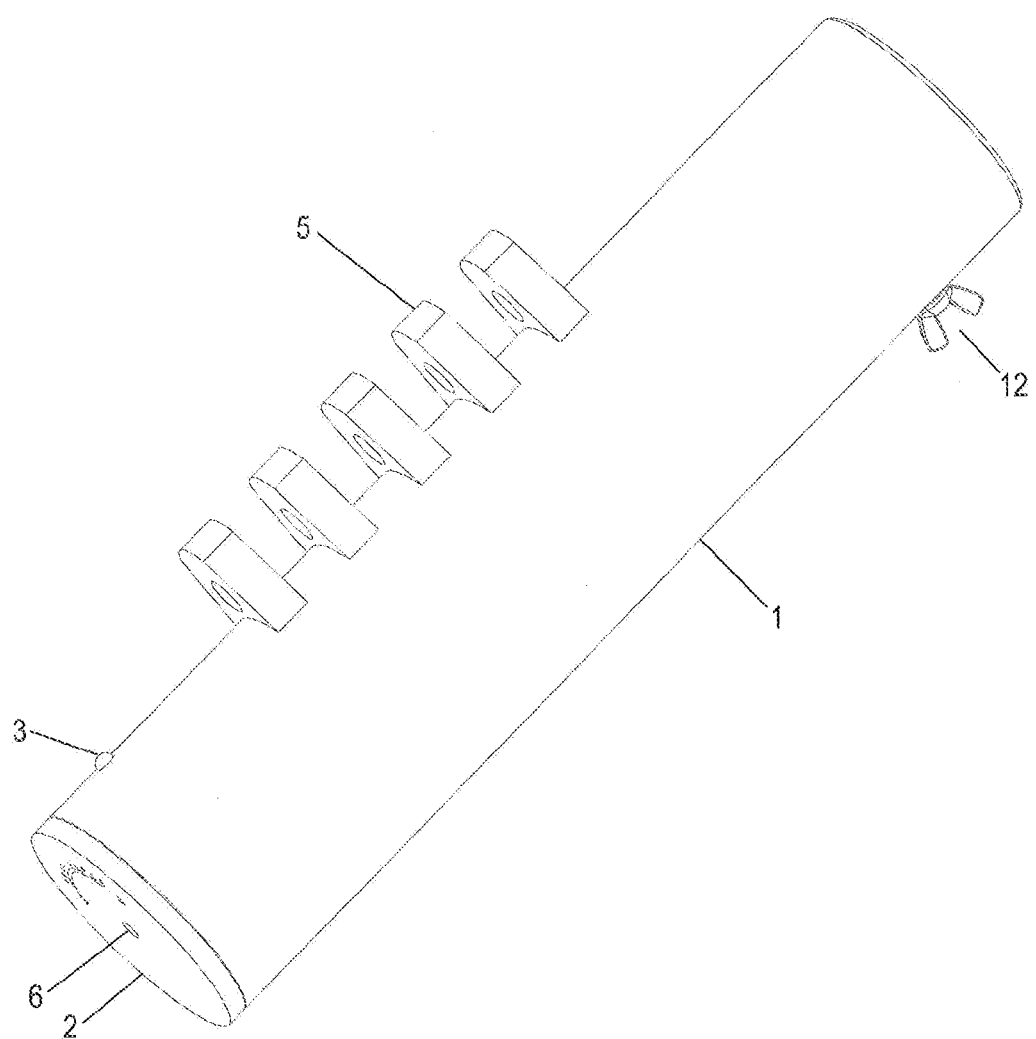
FIG. 4 is a side view of the sleeve of FIG. 1, according to an exemplary embodiment.

In the following description, numerous specific details are set forth in order to provide a more thorough description of the various embodiments of the present invention. It will be apparent, however, to one skilled in the art, that the present invention may be practiced without these specific details. In other instances, well-known features have not been described in detail so as not to obscure the invention.

The figures are now described with like the reference numbers referring to like parts throughout. FIGS. 1-4 and 6 show various views of a fishing aid according to an exemplary embodiment. The fishing aid includes a cylindrical sleeve 1. The sleeve 1 may be formed of any suitable material such as plastics, metals, composites, or the like. While the sleeve 1 is shown in this embodiment to be cylindrical, the sleeve 1 may take on any appropriate tubular shape, such as a tube with a rectangular, square, oval, or other shaped cross section.

The sleeve 1 includes a bottom cover 2 that covers one end of the sleeve 1. The other end of the sleeve 1 is left open such that a fishing rod may be inserted therein. The bottom cover 2 includes at least one aperture 6 that is configured as audio port or ports, described in more detail below. A light 3 is also disposed on an outer surface of the cylindrical sleeve 1.

In this embodiment, a plurality of rod holders 5 are disposed on the outer surface of the cylindrical sleeve 1. The rod holders 5 may be formed integrally with the sleeve 1, or may be attached to the surface of the sleeve 1 via any suitable fastener or adhesive, or via a joining process such as welding. In this embodiment, the rod holders 5 are five approximately trapezoidal projections that extend from the outer surface of the sleeve 1.

Figure 8:
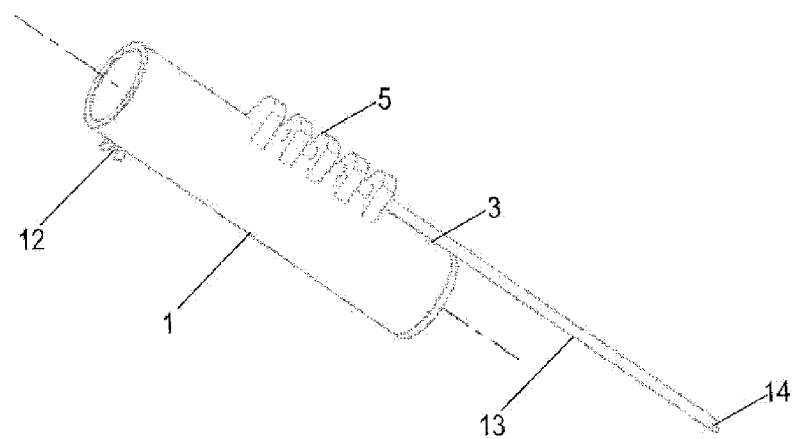
FIG. 8 is a view of fishing aid, according to an exemplary embodiment.
Figure 9:
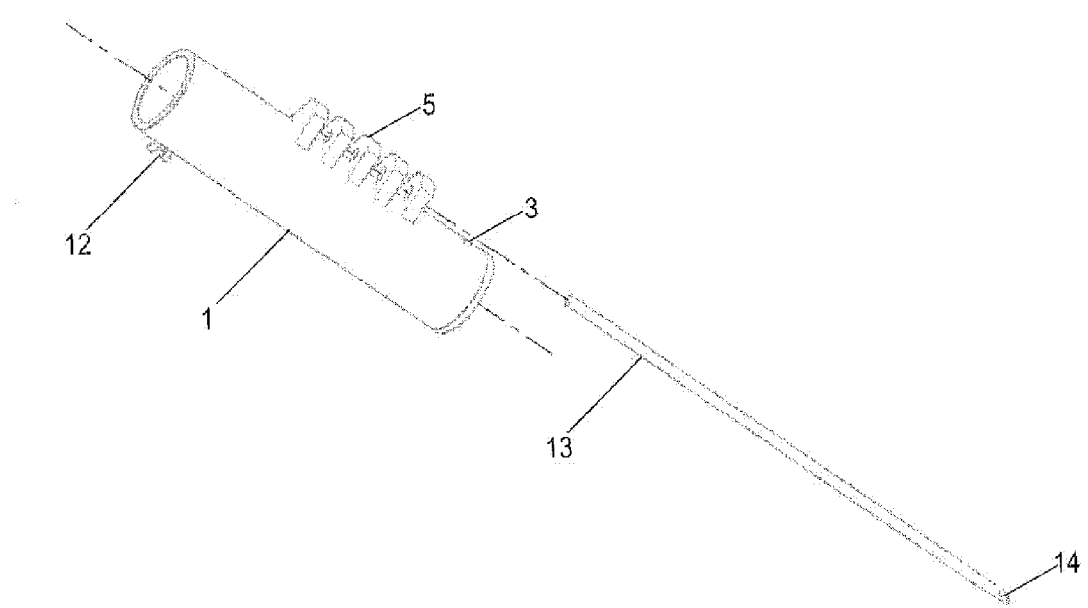
FIG. 9 is a disassembled view of the fishing aid of FIG. 8, according to an exemplary embodiment.

The lower projections each include an aperture for receiving a rod 13 (see FIGS. 8 and 9) for fixing the sleeve 1 in a predetermined position. Thus, the apertures of the projections are configured to be substantially aligned with one another. The top most rod holder 5 includes a depression that corresponds with the apertures of the lower rod holders. The top of the rod 13 may fit within the depression such that the sleeve rests on the rod 13 by the interaction of the top of the rod 13 with the depression. The rod is placed in the ground via a spiked tip 14. For example, the spiked tip may be placed on the ground and the rod 13 may be pounded into the ground by a hammer. The sleeve 1 may then be placed in position on the rod 13 via the rod holders 5.

The rod holders 5 are not limited to this configuration, and may be modified while still maintaining the same functions. For example, greater or fewer than five projections may be used, or the shape and thickness of the projections may vary. For example, one sufficiently thick projection with a single non-through hole that does not extend completely through the projection may be sufficient a rod holder.

The sleeve 1 further includes at least one aperture 4 that is a moisture drip hole or drain. The drain 4 allows any moisture from the environment or the fishing rod to be expelled during use.

In this embodiment, the sleeve 1 facilitates an adjustable bite sensor 12. The bite sensitivity adjustment will discussed in further detail below. The adjustable bite sensor 12 may consist of a threaded member that moves in response to the twisting of the sensor 12. For example, the adjuster 12 may include a wing-bolt.

Figure 5:
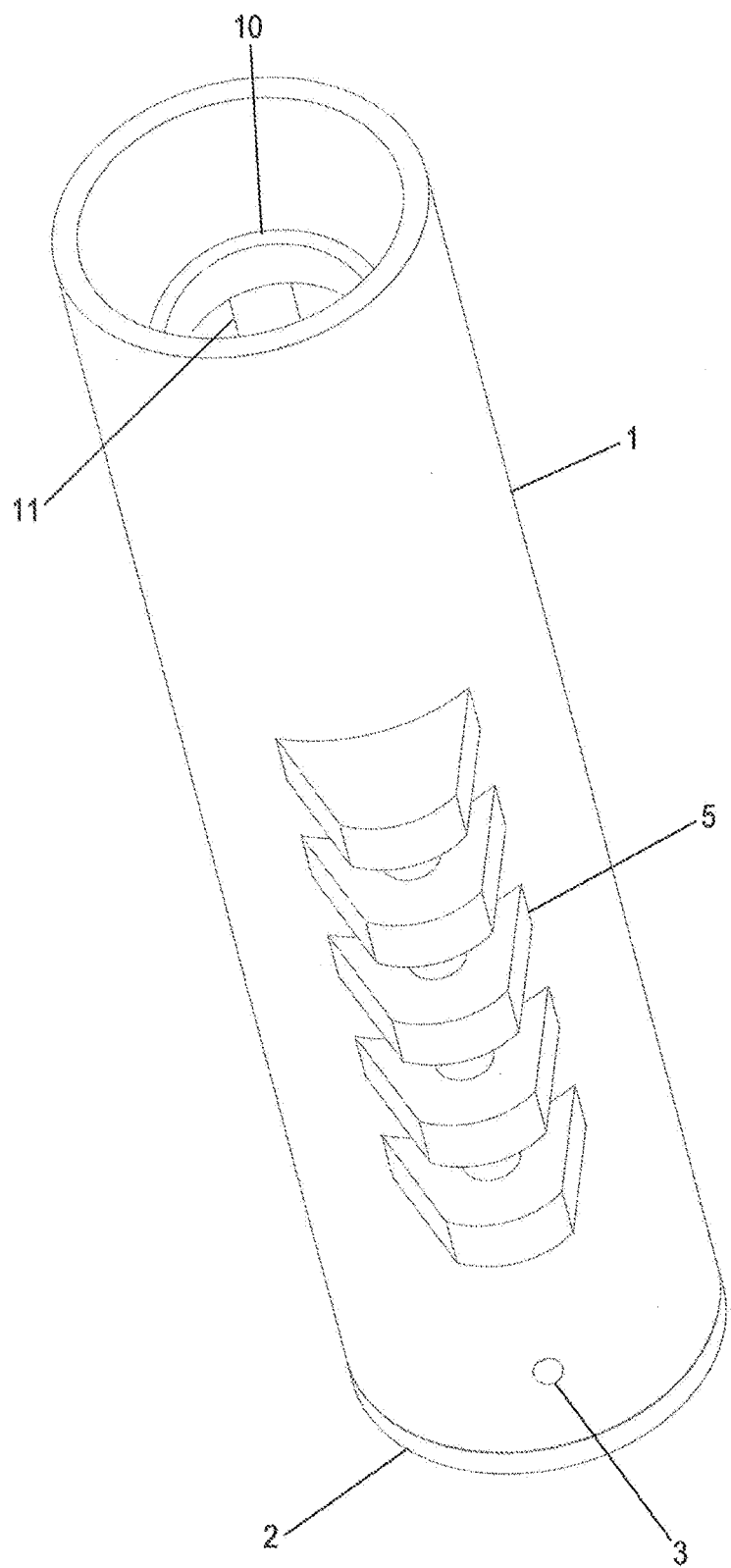
FIG. 5 is top perspective view of the sleeve of FIG. 1, according to an exemplary embodiment.
Figure 6:
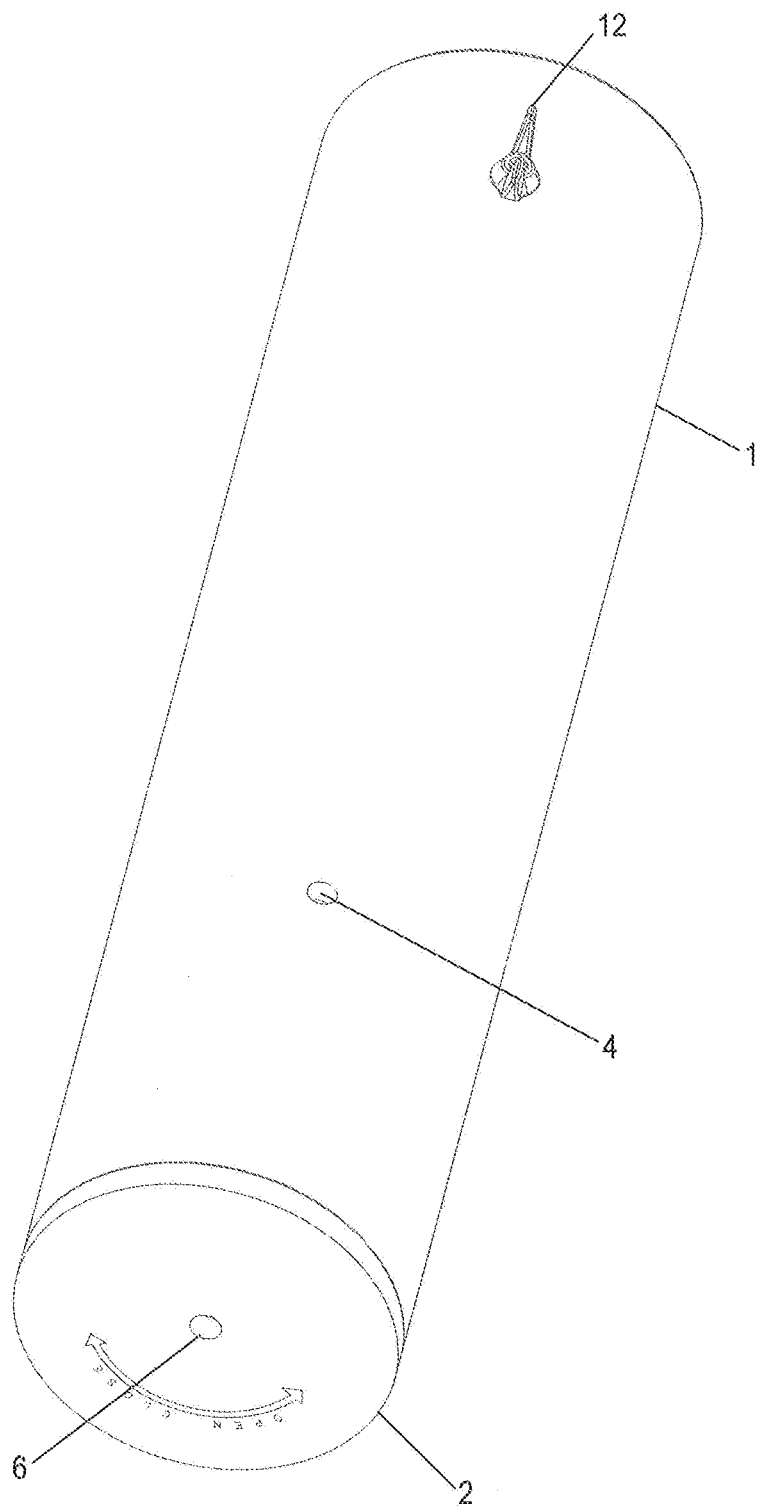
FIG. 6 is a bottom perspective view sleeve of FIG. 1, according to an exemplary embodiment.
Figure 7:
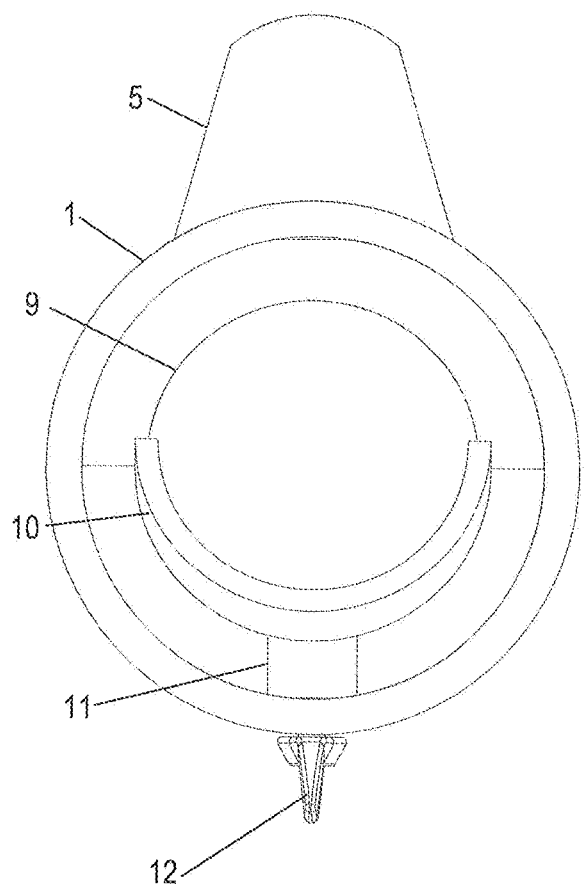
FIG. 7 is a top view of the sleeve of FIG. 1, according to an exemplary embodiment.

FIGS. 5 and 7 show a perspective top view and top view of the fishing aid according to an exemplary embodiment. FIGS. 10-13 show sectional, exploded, and assembled views of the fishing aid. In this embodiment, the sleeve 1 includes a pole stabilizer 10 mounted to a spring actuated bracket 11. The pole stabilizer 10 in this embodiment is formed in a semi-circular shape such that a fishing pole may rest against the pole stabilizer 10.

The pole stabilizer 10 may be mounted to the bracket 11 via fasteners, welding, and adhesive, or the like. The pole stabilizer 10 may also be integrally formed with the bracket 11. The spring actuated bracket 11 biases the pole stabilizer away from an inner surface of the sleeve 1. The bracket 11 may include a coil or leaf spring, or may be based on the resiliency of the material used for the bracket 11.

Figure 10:
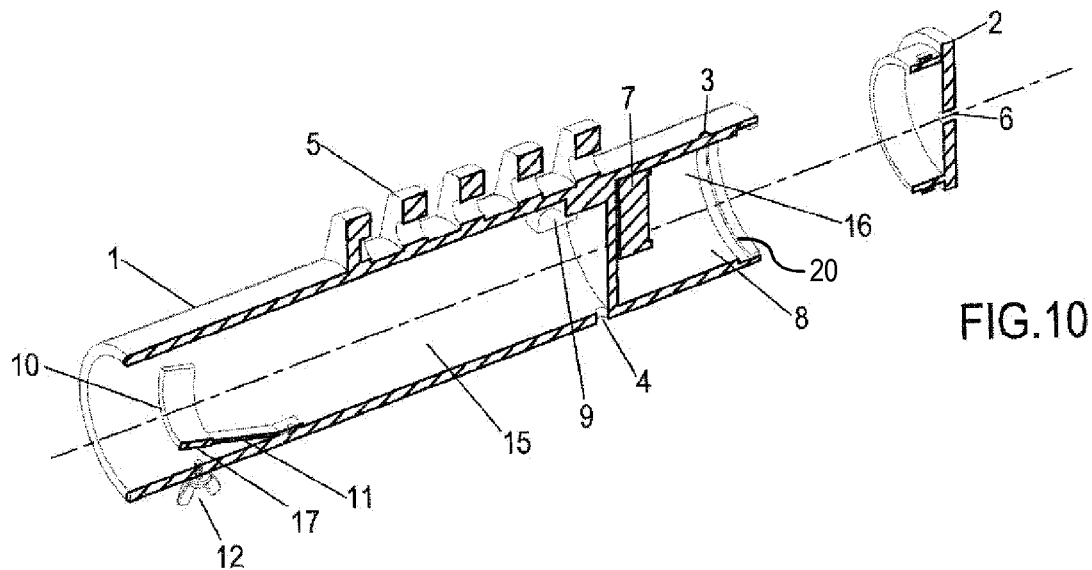
FIG. 10 is a sectional view of a sleeve of a fishing aid, according to an exemplary embodiment.
Figure 11:
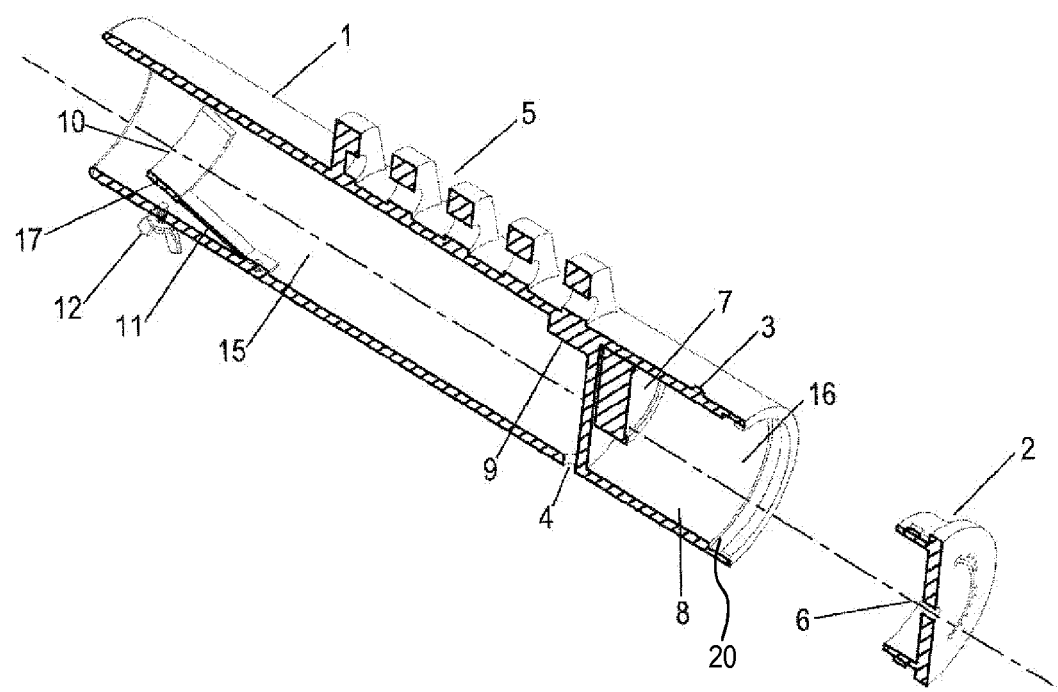
FIG. 11 is a sectional view of a sleeve of a fishing aid, according to an exemplary embodiment.

The interior of the sleeve 1 is divided into compartments as shown in FIGS. 10 and 11. Specifically, the sleeve 1 has an upper compartment 15 and a lower compartment 16. The drain 4 is disposed so as to be at the bottom of the upper compartment in which the fishing pole is placed. In this manner, liquid is prevented from leaking into the lower compartment 16. The upper compartment 15 further includes a shaft holder 9 that receives the lower end of the shaft of the fishing pole and positions the fishing pole within the compartment 15.

Within the lower compartment 16 is a piezo buzzer unit 7 and a battery compartment 8. The piezo buzzer unit 7 is configured to create a sound, such as an alarm or buzzing sound which is emitted from the lower compartment 16 via the at least one audio port hole 6. The piezo buzzer unit 7 is powered by a battery placed in the battery compartment 8.

The fishing aid further includes wiring (not shown) to activate the piezo buzzer 7 when the pole stabilizer 10 and/or bracket 11 comes into contact with the bite adjustable sensor 12. Specifically, when the stabilizer 10 and/or bracket 11 contacts the sensor 12, a circuit is completed that activates the buzzer 7, and the buzzer or alarm sound is generated. This may of course be implemented by other means, such as via software in the buzzer 7 that instructs the buzzer 7 to create the alarm when the sensor 12 is triggered.

The piezo buzzer 7 also activates the light 3. The light 3 may be any suitable light such as an LED. The light may be configured as a part of the piezo buzzer 7, and the sleeve 1 may including an aperture to allow the light 3 to pass through the surface of the sleeve 1.

Operation

Figure 12:
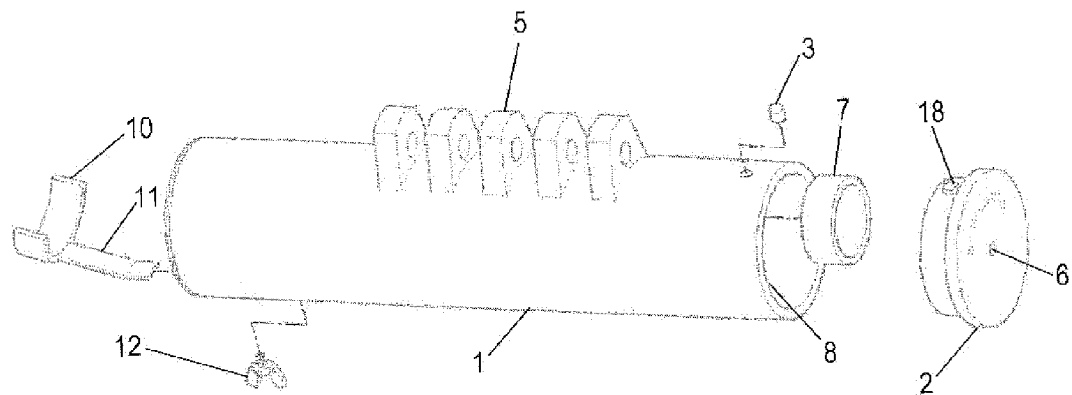
FIG. 12 is an exploded assembly view of a sleeve of a fishing aid, according to an exemplary embodiment.
Figure 13:
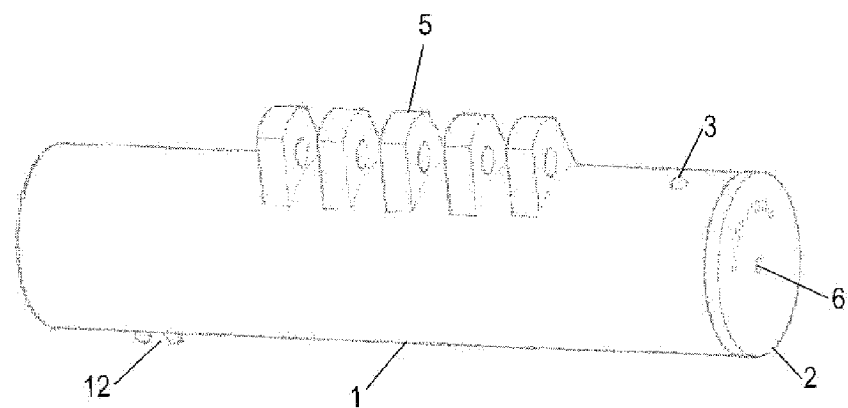
FIG. 13 is an assembled view of a sleeve of a fishing aid, according to an exemplary embodiment.

To further aid in understanding the embodiments, a method of operation will now be described. First, a user may remove the bottom cover 2 on the lower end of the sleeve 1 to insert a battery in the battery compartment 8. The bottom cover 2 may then be reattached. The bottom cover 2 may be removable such as by twisting by a ¼ turn to lock/unlock the cover 2. For example, as shown in FIG. 12, the cover 2 may include a projecting guide 18 that is received in a corresponding groove 20 (FIGS. 10 and 11) on an inner surface of the sleeve 1 to lock the bottom cover 2 securely.

Next, the rod 13 with a spiked tip 14 is inserted into the soil at a predetermined location, such as near a lake, river, stream, etc. The rod 13 is carefully and securely inserted into the ground such as by pounding the rod 13 with a hammer into the soil at approximately 60° from the ground at a sufficient depth to hold the weight of the sleeve 1.

The sleeve 1 is then placed over the rod 13 via the rod holders 5. The rod 13 is placed through the holes of the rod holders 5 and rests against the depression in the top rod holder to secure the sleeve 1 in position.

A user then adjusts the sensitivity of the adjustable bite sensor 12 by adjusting the distance between the bite sensor 12 and contact 17. As explained above, the adjustable bite sensor 12 may include a contact mounted on a wing bolt. The wing bolt may be turned, for example, clockwise for more sensitivity and counter clockwise for less sensitivity.

Once the fishing aid is set, a user may cast his or her line out into the body of water to an intended target area and may set the drag on a fishing reel. Then, the user may slide the fishing pole into the sleeve 1 in the upper compartment 15 and place the fishing pole handle against the pole stabilizer 10. The base of the fishing pole handle rests against the shaft holder 9.

When a bite or strike occurs the fishing rod bends. The force of the strike transferred from the fishing pole to the pole stabilizer 10 mounted on the spring actuating bracket 11 causes the bracket 11 to deflect towards the adjustable bite sensor 12. If the force is sufficient, the contact 17 on the pole stabilizer 10 and/or bracket 11 contacts the adjustable bite sensor 12. This causes a signal to be sent from a connecting wire (not shown) in the upper compartment 15 to lower compartment 16 to trigger the indicator, such as the light 3 and/or the buzzer 7 to go on. The bottom cover 2 may include an audio port hole 6 to allow sound from buzzer 7 to be emitted from lower compartment 16.

In this manner, a user does not need to actively hold the fishing pole while waiting for a fish to strike. The user may instead relax or focus on other things while fishing. Furthermore, a person with disabilities who cannot actively hold the fishing pole, or one who is blind or deaf may also enjoy the activity of fishing via the fishing aid.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A fishing aid comprising:
   a sleeve formed from an elongated hollow tubular member having a top end and a bottom end, wherein the top end is open and the bottom end includes a closable bottom cover, the sleeve being divided into an upper compartment accessible through the open top end and a lower compartment accessible through the bottom cover;
   a pole holder including a pole stabilizer and a spring actuated bracket, the pole holder being disposed inside the upper compartment of the sleeve toward the top end;
   an indicator circuit including an indicator disposed in the lower compartment, and a switch including two contacts, a first contact being disposed in the upper compartment and a second contact being disposed on the pole holder, the first and second contacts being aligned so as to close the indicator circuit and actuate the indicator when the spring actuated bracket is deflected to cause the second contact on the pole holder to touch the first contact on the sleeve;
   a rod holder disposed on an outer surface of the sleeve, said rod holder comprising a plurality of projections extending from the sleeve, lower projections of the plurality of projections each include a through-hole, an uppermost projection of the plurality of projections includes a depression, and the through-holes and the depression are disposed in alignment; and
   a rod with a spiked tip, the rod being received in the through-holes, wherein the sleeve is configured to be supported on the rod via the rod holder.

2. The fishing aid according to claim 1, wherein the indicator is a piezo buzzer.

3. The fishing aid according to claim 1, wherein the indicator is a light.

4. The fishing aid according to claim 1, wherein the indicator includes a piezo buzzer and a light.

5. The fishing aid according to claim 1, wherein the first contact is mounted to an adjustable bite sensor configured to change an amount of deflection in the spring actuating bracket needed to cause the first and second contacts to touch.

6. The fishing aid according to claim 5, wherein the adjustable bite sensor comprises a wing bolt.

7. The fishing aid according to claim 1, further comprising a drain in a lower end of the upper compartment.

8. The fishing aid according to claim 1, further comprising a shaft holder disposed on the lower end of the upper compartment, the shaft holder being configured to receive and support a handle of a fishing pole.

9. The fishing aid according to claim 1, wherein an upper surface of the rod opposite the spiked tip is configured to be seated in the depression.

10. The fishing aid according to claim 1, wherein the bottom cover includes a projecting guide that fits within a corresponding groove of an inner surface of the sleeve.

11. A fishing aid comprising:
    a sleeve formed from an elongated hollow tubular member having a top end and a bottom end, wherein the top end is open and the bottom end includes a closable bottom cover, the sleeve being divided into an upper compartment accessible through the open top end and a lower compartment accessible through the bottom cover;
    a pole holder including a biased bracket, the pole holder being disposed inside the upper compartment of the sleeve toward the top end;
    an indicator disposed in the lower compartment, the indicator being triggered by a first contact and a second contact coming into contact, the first contact being disposed in the upper compartment and the second contact being disposed on the pole holder, the first and second contacts being aligned so as to contact when the biased bracket is deflected to cause the second contact on the pole holder to touch the first contact on the sleeve;
    a rod holder disposed on an outer surface of the sleeve, said rod holder comprising a plurality of projections extending from the sleeve, lower projections of the plurality of projections each include a through-hole, an uppermost projection of the plurality of projections includes a depression, and the through-holes and the depression are disposed in alignment; and
    a rod with a spiked tip, the rod being received in the through-holes, wherein the sleeve is configured to be supported on the rod via the rod holder.

\* \* \* \* \*